(12) United States Patent
Jantzen

(10) Patent No.: US 6,973,029 B1
(45) Date of Patent: Dec. 6, 2005

(54) REDUNDANT SERIAL BUS AND METHOD FOR THE OPERATION THEREOF

(75) Inventor: Wolfgang Jantzen, Minden (DE)

(73) Assignee: ABB Patent GmbH, Ratingen (DE)

(*) Notice: Subject to any disclaimer, the term of this patent is extended or adjusted under 35 U.S.C. 154(b) by 0 days.

(21) Appl. No.: 09/446,320

(22) PCT Filed: Jun. 11, 1998

(86) PCT No.: PCT/DE98/01656

§ 371 (c)(1),
(2), (4) Date: Feb. 24, 2000

(87) PCT Pub. No.: WO98/59464

PCT Pub. Date: Dec. 30, 1998

(30) Foreign Application Priority Data

Jun. 20, 1997 (DE) ................................ 197 26 158

(51) Int. Cl.[7] .............................. H04J 1/16; H04J 3/14; H04L 1/00; H04L 12/26

(52) U.S. Cl. ...................................... 370/228; 370/217

(58) Field of Search ................................ 370/364–366, 370/228, 216, 217, 225

(56) References Cited

U.S. PATENT DOCUMENTS

| | | | | |
|---|---|---|---|---|
| 4,630,265 A | * | 12/1986 | Sexton | 370/228 |
| 5,185,537 A | * | 2/1993 | Creedon et al. | 307/234 |
| 5,208,597 A | * | 5/1993 | Early et al. | 341/172 |
| 5,387,769 A | * | 2/1995 | Kupersmith et al. | 17/248 |
| 5,488,638 A | * | 1/1996 | Kazecki et al. | 375/347 |
| 5,946,294 A | * | 8/1999 | Stein | 370/221 |
| 5,956,319 A | * | 9/1999 | Meli | 370/224 |
| 6,456,406 B1 | * | 9/2002 | Arecco et al. | 398/59 |

* cited by examiner

Primary Examiner—Chi Pham
Assistant Examiner—Ronald Abelson
(74) Attorney, Agent, or Firm—Michael M. Rickin, Esq.

(57) ABSTRACT

The connection of serial bus systems which are known per se, but have no system-integrated redundancy apparatus, to one another by means of bus lines of redundant design, is accomplished by a redundancy apparatus which can be connected upstream is connected between the bus communications interface of a bus subscriber and the redundant bus lines. In this case, during operation, transmission always takes place on all the bus lines, and a fault-free bus line is selected at the receiving end. The redundancy apparatus has an evaluation stage that determines criteria of a data stream other than the presence or absence of data for a period of time and the content of said data stream for selecting one of the bus lines as the receiving line based on the criteria.

13 Claims, 4 Drawing Sheets

REDUNDANT SERIAL BUS AND METHOD FOR THE OPERATION THEREOF

Figure 1:
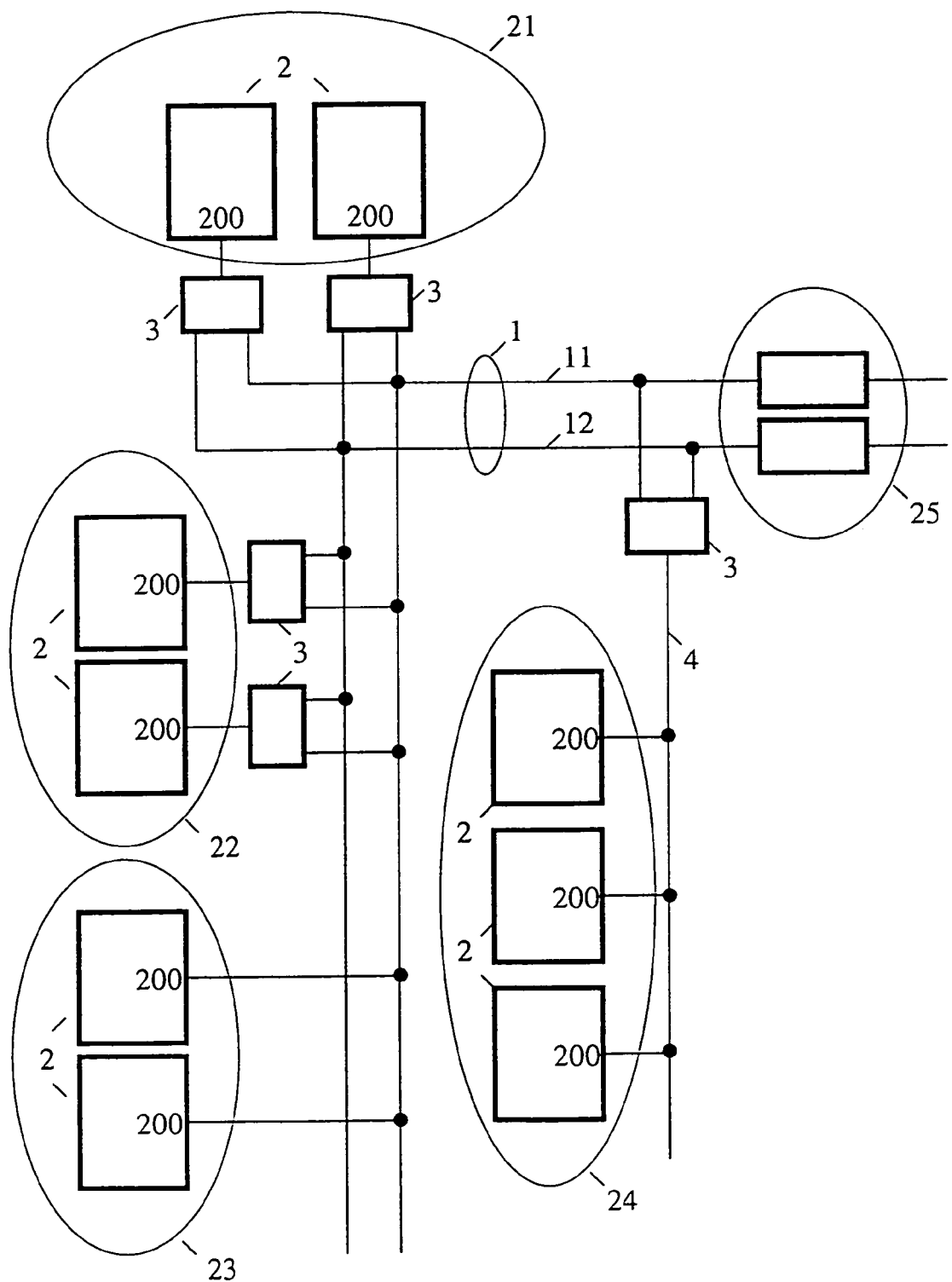

The invention relates to a redundant serial bus and to a method for its operation.

The general problem is to connect serial bus systems which are known per se but have no system-integrated redundancy means, that is to say correctly standardized and thus interoperable bus systems, to one another by means of bus lines of redundant design.

Furthermore, there is a problem in selecting one of the bus lines of redundant design for communication in that it is no longer possible to identify complex faults at the purely physical level by, for example, transmission level identification. The evaluation must be carried out at a higher level of protocol processing. First of all, at least a portion of the serial transmission must be identified as being correct before the selected line can be selected for receiving the message. The monitored portion of the message must be at least sufficiently long that reflections, which may have a specific delay time on the bus, are reliably identified.

Normally, bus systems use special bus controllers for the lower layers of the transmission protocol. If these controllers do not provide appropriate redundancy, the necessary locations for the implementation of appropriate redundancy are no longer accessible to a user of this controller.

It Is known from the publication "Automatisierungstechnik" [Automation Engineering] R. Oldenbourg Veriag Vienna 1992, Volume I, page 406 for the data traffic to be switched from the active bus to a passive bus in a redundant system when a changeover criterion occurs, in which case the respective active bus represents a selection, which can be predetermined, of identical and equal-priority buses in the redundant bus system. Failures of the active bus and cyclic interrogations of the difference between the transfer requests on the active and passive buses are intended to be used as the changeover criterion.

A method for operation of an asynchronous and redundant serial bus, comprising n>1 parallel independent lines, is known from DE 195 13 318, in which at least two multiplexers are provided which can be synchronized to, one another and are suitable for bidirectional transmission of data information between a serial bus interface and one of the parallel lines. In this case, the invention provides that a preferred line of the redundant serial bus is defined as the primary bus and the n−1 remaining lines are defined as standby buses, that, when data traffic takes place without any disturbance, data information is interchanged between the stations connected via the multiplexers, via the primary bus as the active bus, and control information is interchanged between the multiplexers via at least one bus which can be predetermined, that, if the transmission quality on the active bus falls below a limit which can be predetermined, a standby bus which can be predetermined is defined as the active bus, a fault message is passed to a higher-level entity and the deactivated bus is analysed, and that, if the transmission quality of the primary bus rises beyond a limit which can be predetermined, the primary bus is defined as the active bus once again.

In this case, the complexity for synchronization of all the bus subscribers to the active bus is regarded as being disadvantageous both in terms of material and with respect to the protocol functions required for this purpose. Since the synchronization means are bus subscribers themselves, the number of available subscriber addresses for stations that can be connected is, furthermore, reduced.

An Ethernet bus system which can be segmented and has n>1 bus lines is known from DE 195 13 316 for redundant networking of single-port stations with one control output and one communications port, in which bidirectional multiplexers are provided, having one multiplexed port and: n line ports, and a control input. At least one monitoring device having n line ports is connected to the n bus lines of an Ethernet segment. Each single-port station is assigned a multiplexer, in which case the communications port of the single-port station is connected to the multiplexer port of the multiplexer, and the control output of the single-port station is connected to the control input of the multiplexer. The n line ports of each multiplexer are connected to the n bus lines of an Ethernet segment.

Disadvantageously, each single-port station has to be equipped with a control output for controlling the multiplexer. Particularly when retrofitting redundant bus lines in existing systems, no such control output is available.

Furthermore, an Ethernet bus system, which can be segmented, is known from DE 195 13 315 for redundant networking of single-port stations, in which two lines are arranged in parallel, at least in segment elements, and addressable bidirectional multiplexers are provided as active network subscribers for connection of the single-port stations to the two lines, which multiplexers can be controlled by means of at least one monitoring unit, which can be addressed as an active network subscriber.

A disadvantage in this case is the large number of network addresses required, which limits the number of possible single-port stations in the same network.

The invention is based on the object of specifying means which allow serial bus systems which are known per se and have no system-intergrated redundancy means to be connected to one another by means of bus lines of redundant design. In this case, the existing bus system is intended to remain as uninfluenced as possible, and to be capable of compatible use. Mixed operation with non-redundant subscribers is intended to be possible, and the redundancy means are intended to identify and process even relatively complex faults, such as incorrect bus terminations and the like, correctly.

The invention now comprises, for each of the receiving lines, additionally handling a portion of the protocol in the upstream device in order to satisfy the necessary decision criteria. After the evaluation, a fine which has been identified as being fault-free is then selected. The selected line is then converted back to the original signal, in such a way that it can be read to the normal communications controller or the appliance.

The invention is in this case based on the knowledge that faults in the transmission path can normally be identified in the preamble or, in the case of UART protocols, during the transmission of the first byte.

According to the invention, an upstream device is provided to which, on the one hand, bus lines of redundant design and, on the other hand, subscribers or appliances without system-integrated redundancy means are connected, in which case one of the bus lines is in each case connected to the connected subscriber or appliance, completely dispensing with system-integrated redundancy means.

In such redundant bus systems, transmissions are always made on all the lines, while any fault-free line is selected for reception. This means that different receivers connected to the same bus lines can identify different bus lines as being fault-free.

The available bus controllers can still be used, in an advantageous manner. Furthermore, existing appliances with bus controllers but without system-integrated redundancy means can easily be networked redundantly, without changing the system architecture. There is no need for any additional subscriber addresses for synchronization means.

The concept of upstream redundancy applies to all types of serial communication, and is implemented in the physical layer. One receiving line from n (n>=m+1) receiving lines is selected for redundancy, depending on the validity of a data stream. The selection applies for the duration of a transmission block (frame). Transmission takes place on all the transmitting lines. Receiving and transmitting lines may be combined to form a bidirectional bus line.

The invention will be explained in more detail in the following text with reference to an exemplary embodiment with two parallel bus lines. In the drawings required for this purpose:

FIG. 1 shows an outline illustration of a redundant bus system

Figure 2:
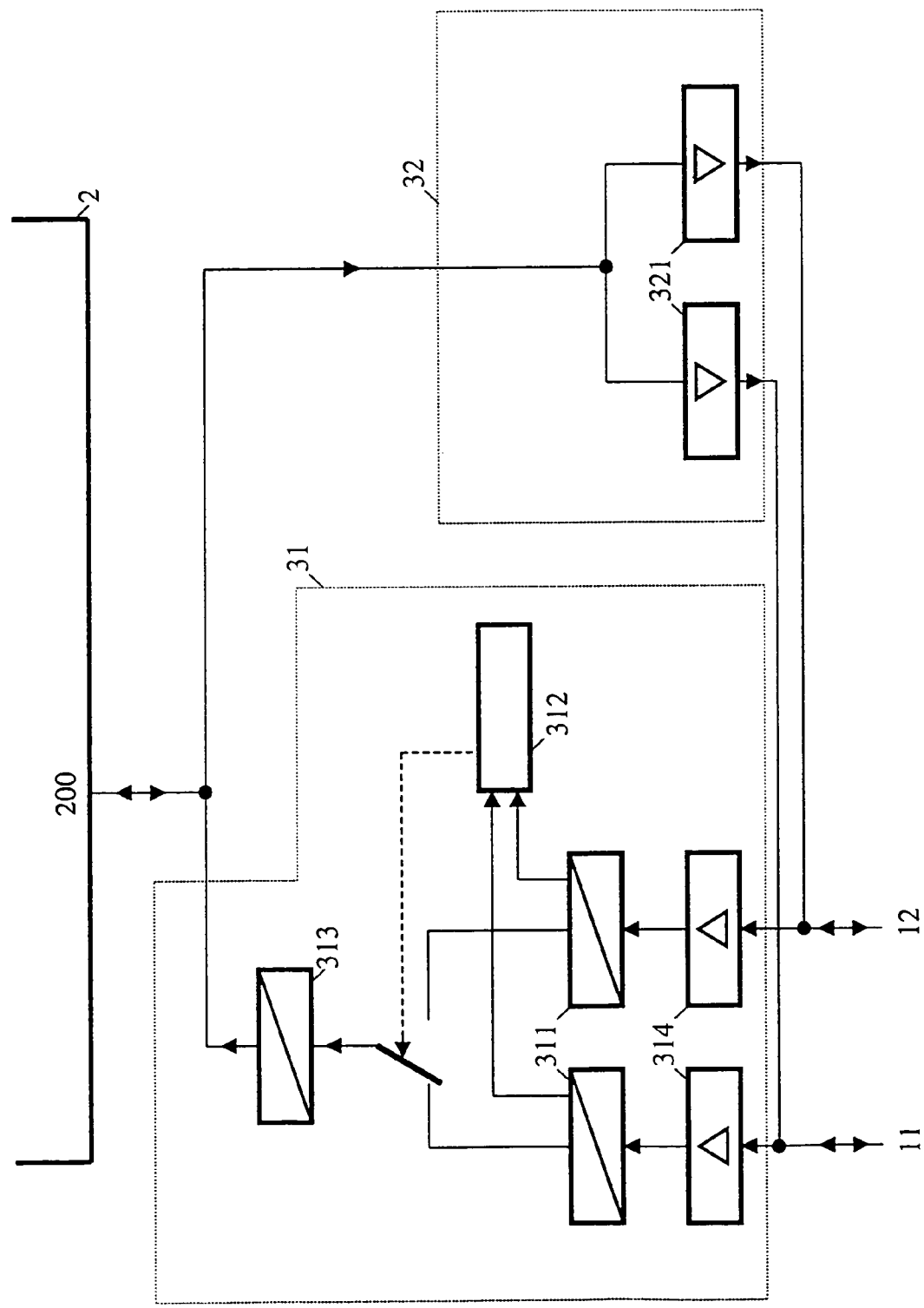
Figure 3:
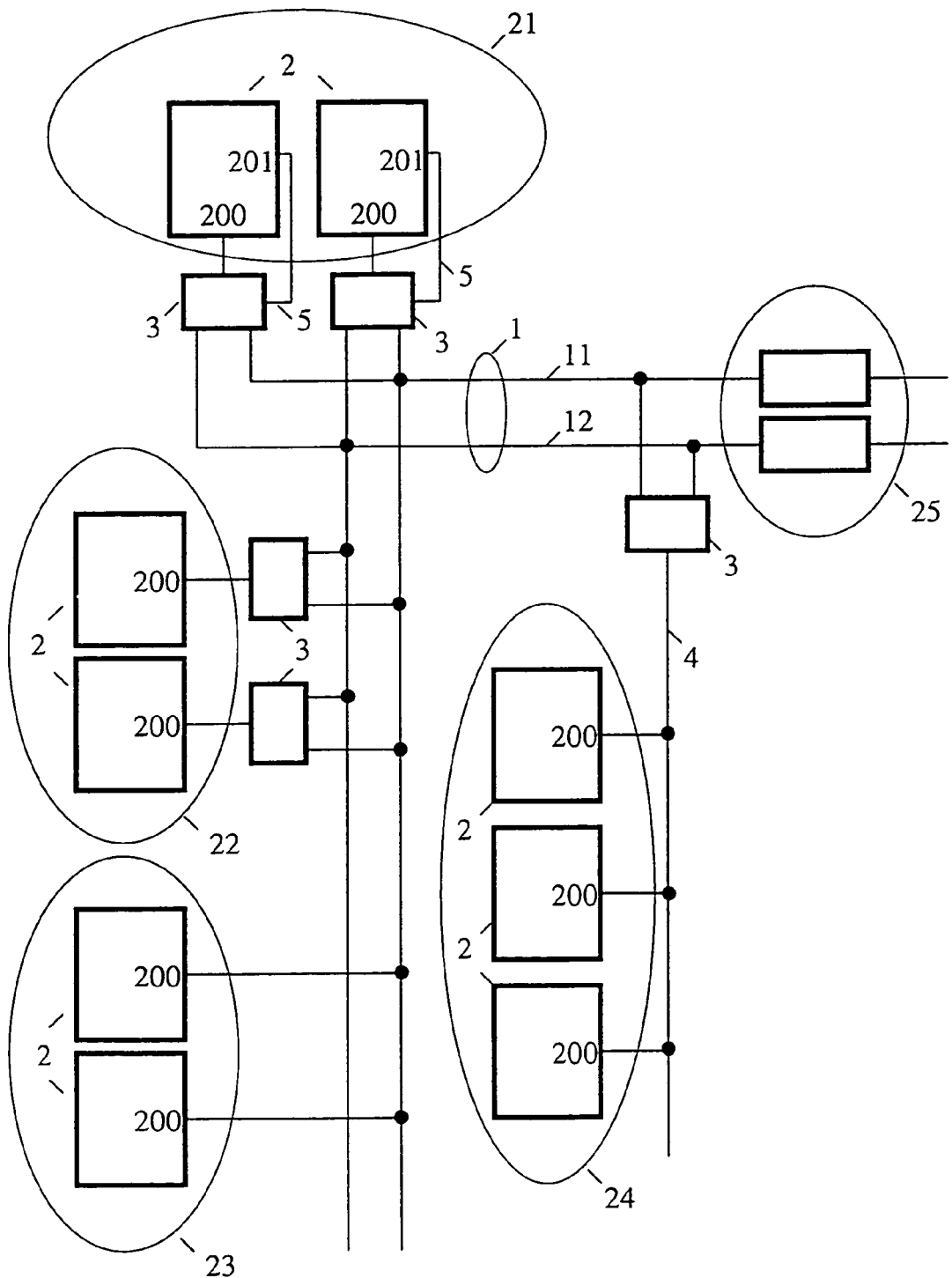
Figure 4:
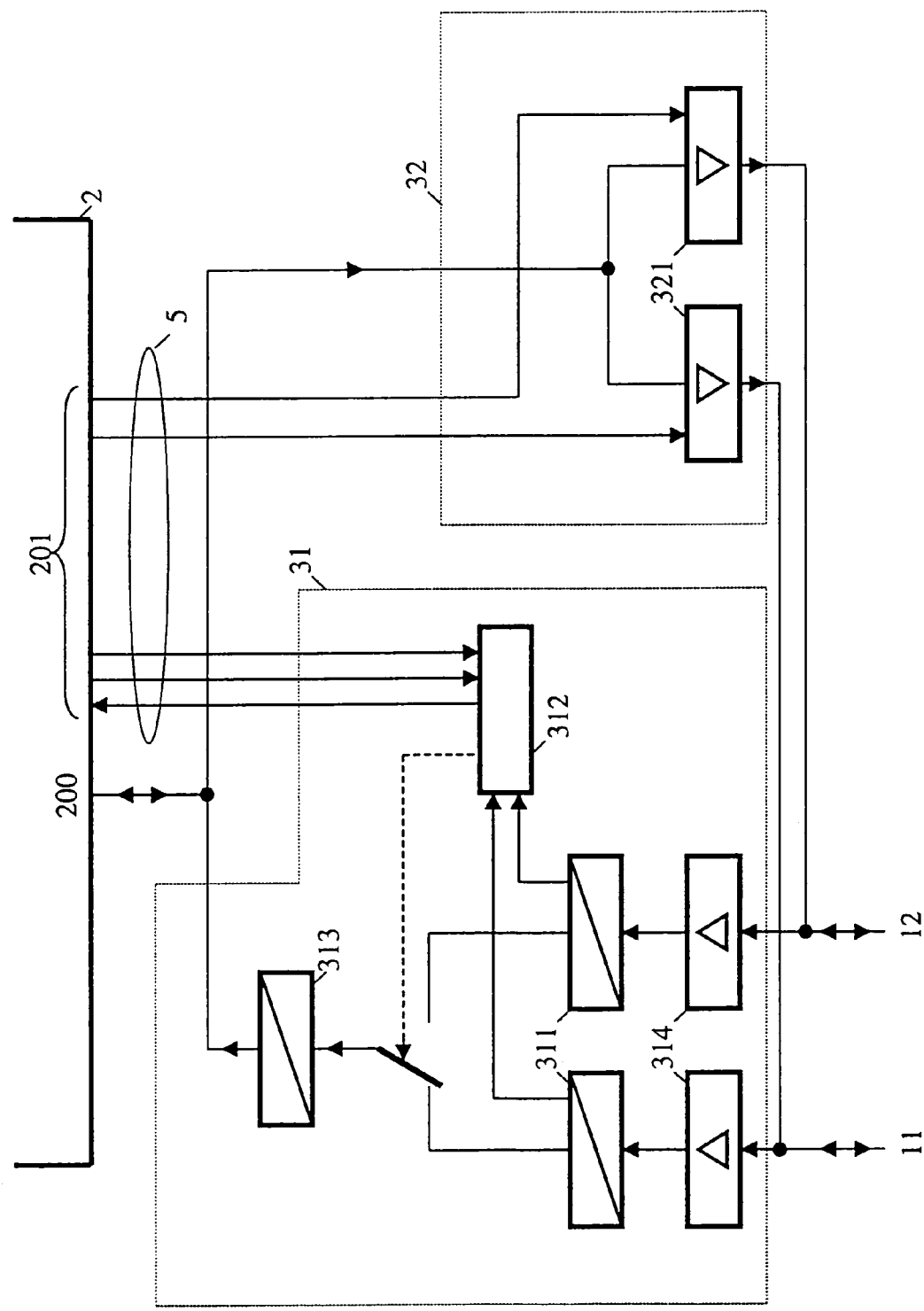

FIG. 2 shows a block diagram of a redundancy means which can be connected upstream FIG. 3 shows an outline illustration of a redundant bus system with monitoring FIG. 4 shows a block diagram of a redundancy means which can be connected upstream, with monitoring The outline of a redundant bus system according to the invention is shown in FIG. 1. Groups 21 to 25 of bus subscribers 2 are connected to a redundant serial bus 1, which comprises two bus lines 11 and 12, with each of the bus subscribers 2 having a single, redundancy-free bus communications interface 200.

The bus subscribers 2 in the first and second groups 21 and 22 are each connected via a subscriber-specific redundancy means 3, which can be connected upstream, to both bus lines 11 and 12 of the redundant serial bus 1. The bus subscribers 2 in the fourth group 24 are connected via a redundancy-free serial bus 4 and a common redundancy means 3, which can be connected upstream, to both bus lines 11 and 12 of the redundant serial bus 1. The bus subscribers 2 in the third group 23 are connected exclusively to the bus line 11 of the redundant serial bus 1. The connection to one of the bus lines 11 and 12 is in this case advantageously optional, and the connections can be mixed. There is no need for any preferred position in this case.

The redundancy of the serial bus 1 can be scaled in a particularly advantageous manner to satisfy the requirements for availability of the individual bus subscribers 2. Furthermore, mixed operation of subscribers 2, connected in a redundant and non-redundant fashion, on the same redundant serial bus 1 is possible.

The fifth group 25 comprises so-called repeaters, which are each intended for connecting one bus line 11 and 12 in a first segment to in each case one bus line in a second segment of the same bus system.

FIG. 2 shows the outline structure of a redundancy means 3 which can be connected upstream. The redundancy means 3 which can be connected upstream is equipped with a receiver 31 and a transmitter 32. The receiver 31 comprises in each case one input stage 311, one evaluation stage 312 and one output stage 313 at least for each bus line 11 and 12. The input stage 311 is equipped with means for synchronization, filtering and serial/parallel conversion. Furthermore, means may also be provided for evaluation of the data stream (parity, framing . . . ), and the states may be passed on to the evaluation stage 312. It is expedient for the input stage 311 to have an amplifier 314 connected upstream of it, which has means for matching the input stage 311 to the physical transmission medium of the bus line 11 and 12 of the redundant serial bus 1.

The evaluation stage 312 comprises means for evaluation of the data stream, for time evaluation, for assessing the state of the receiving lines and for line selection.

The output stage 313 has means for parallel/serial conversion, for muting in the case of faulty received date and driver stages (RS485, RS232, optical conductor, . . . ) for matching to the redundancy-free bus communications interface 200 of the bus subscribers 2. Alternatively, it is possible for the serial data stream, delayed for the reception identification time, to be passed on directly from the input stage 311 to the output stage 313. There is then no need for the parallel/serial conversion.

In the input stage 311, the received signal is passed via a filter to a synchronization stage. In the synchronization stage, the receiver 31 is synchronized to the data stream. The transmission rate can be configured or identified automatically. The incoming data stream is evaluated for automatic rate identification. The data stream may be passed on to the evaluation stage 312 in serial or parallel form.

In the evaluation stage 312, the receiving line 11 or 12 is selected on the basis of criteria which are determined from the serial or parallel data stream, the time response and the state of the receiving line 11 and 12. The criteria from the data stream include the frame error, parity error, preambles, synchronization sequences, etc. Further criteria are derived from the time response, from pause times during the data transfer or from the data transfer duration. A time-dependent changeover strategy may also provide criteria. One selection criterion which may characterize the state of the receiving line 11 and 12 is also the signal level, which indicates an overload or underload.

In the output stage 313, bit retiming is carried out for the data stream which has been identified as being valid and has been selected, and this is output via a driver stage. The time delay which occurs in the redundancy means 3 which can be connected upstream is not critical since it is in the same order of magnitude as the cable propagation times (reflection propagation time). If no valid data stream is identified, then the output stage 313 supplies the rest state as the output signal.

At the transmitting end, the redundancy means 3 which can be connected upstream has a transmitter 32 with in each case one driver 321 for each bus line 11 and 12 of the redundant serial bus 1. The data stream to be transmitted is output via the drivers 321 to all the bus lines 11 and 12.

Using the same reference symbols for the same means, FIG. 3 shows the outline of a redundant bus system in which selected bus subscribers 2 are equipped with diagnosis means. In this case, the selected bus subscribers 2 in the first subscriber group 21 are equipped with an additional diagnosis interface 201 and are connected by means of additional control lines 5 to the associated redundancy means 3 which can be connected upstream.

In this context, FIG. 4 shows a block diagram of a redundancy means 3 which can be connected upstream, with additional control lines 5 for monitoring and diagnosis. The evaluation stage 312 in the receiver 31 has an output for outputting status information, and inputs for selection of a dedicated bus line 11 or 12 as the receiving line, which is connected via in each case one of the additional control lines 5 to the additional diagnosis interface 201 of the selected bus subscriber 2 in the first subscriber group 21.

Furthermore, the receiver 31 has means for testing and for diagnosis, which allow the receiver 31 to be set to different operating modes. In addition to selecting a bus line 11 or 12 as the receiving line, which is called the normal mode, reception on a permanently set bus line 11 or 12 is also envisaged, as a function of the validity of a data stream, in which case the evaluation stage 312 may be switched on and off.

For test and diagnosis purposes, the receiver 31 can be configured such that reception takes place exclusively on a specific bus line 11 or 12. In this case, it is possible for the selected bus line 11 or 12 to make a direct connection between the input and the output of the receiver 31. For this purpose, the evaluation stage 312 of the receiver 31 is initialized appropriately by the selected bus subscriber 2, via the control lines 5.

At the transmitting end, the invention provides, for test and diagnosis purposes, for the data stream to be output in a specifically configurable manner on exclusively one or more bus lines 11 and 12. For this purpose, the drivers 321 in the transmitter 32 are equipped with gate circuits, by means: of which the output of the respective driver 321 is muted. Each gate circuit has a control input, which is connected via one of the control lines 5 to the diagnosis interface 201 of the selected subscriber 2.

During diagnosis, a selected subscriber may deliberately transmit and receive data via one and the same selected bus line 11 or 12. This method identifies a defective bus line 11 and 12, and signals this to a higher-level device.

What is claimed is:

1. A redundant serial bus having n>1 parallel bus lines for redundant networking of bus subscribers each having a single bus communications interface, comprising:
    a redundancy means which can be connected upstream, having n interfaces for connection to all of said n parallel bus lines and one interface for connection to the single bus communications interface of at least one bus subscriber,
    said redundancy means which can be connected upstream having a receiving end comprising an input stage at least for each of said bus lines, an evaluation stage and an output stage for all the bus lines,
    the evaluation stage has means for always simultaneously evaluating a data stream on each of said n parallel bus lines, said evaluation based on the content of said data stream other than a predefined error detection character included in said data stream and is other than the presence or absence of data for a period of time, for using said evaluation to select one of said n parallel bus lines as the receiving line for said at least one bus subscriber connected to said redundancy means, and
    said redundancy means which can be connected upstream having a transmitting end comprising a driver for each of said n parallel bus lines.

2. The redundant serial bus of claim 1 wherein the input stage has means for synchronization and filtering.

3. The redundant serial bus of claim 1 wherein the input stage has means for serial/parallel conversion.

4. The redundant serial bus of claim 3, wherein the output stage has means for parallel/serial conversion.

5. The redundant serial bus of claim 1 wherein the means in said evaluation stage for simultaneously evaluating the data stream also includes means for time evaluation, for assessment of the state of the receiving lines and for line selection.

6. The redundant serial bus of claim 1 wherein the redundancy means which can be connected upstream can be permanently set to one bus line on the receiving side.

7. The redundant serial bus of claim 1 wherein the redundancy means which can be connected upstream can be permanently set to one bus line on the transmitting side.

8. The redundant serial bus of claim 7,
    wherein each driver comprises a gate circuit for muting the driver output.

9. The redundant serial bus of claim 1 wherein at least one selected bus subscriber is equipped with a diagnosis interface for connection of control lines.

10. The redundant serial bus of claim 1 further comprising another redundancy means which can be connected upstream, having n interfaces for connection to all of said n parallel bus lines and one interface for connection to the single bus communications interface of at least another one bus subscriber,
    said another redundancy means which can be connected upstream having a receiving end comprising an input stage at least for each of said bus lines, an evaluation stage and an output stage for all the bus lines,
    the evaluation stage has means for simultaneously evaluating a data stream on each of said n parallel bus lines, said evaluation based on the content of said data stream other than a predefined error detection character included in said data stream and is other than the presence or absence of data for a period of time, for using said evaluation to select independently of any selection made by any other redundancy means connected to said n parallel bus lines one of said n parallel bus lines as the receiving line for said at least one another bus subscriber connected to said redundancy means, and
    said redundancy means which can be connected upstream having a transmitting end comprising a driver for each of said n parallel bus lines.

11. In a redundant serial bus having n>1 parallel bus lines for redundant networking of bus subscribers each having a single bus communications interface, comprising:
    a redundancy means which can be connected upstream, having n interfaces for connection to all of said n parallel bus lines and one interface for connection to the single bus communications interface of at least one bus subscriber,
    said redundancy means which can be connected upstream having a receiving end comprising an input stage at least for each of said bus lines, an evaluation stage and an output stage for all the bus lines,
    a method for operating said redundant serial bus, comprising:
    sending, during operation, identical message packets in parallel and at the same time to all of said bus lines,
    receiving the identical message packets on all of said bus lines in parallel by said redundancy means which can be connected upstream,
    always simultaneously evaluating in said redundancy means evaluation stage the data stream message packets on each of said n parallel bus lines, said evaluation based on the content of said data stream other than a predefined error detection character included in said data stream and is other than the presence or absence of data for a period of time; and checking the evaluation of the data streams of the received message packets; and selecting depending on said simultaneous evaluation one of said n parallel bus lines whose data stream is passed on to the connected bus subscriber.

12. The method of claim 11 further comprising sending and receiving said message packets on one of said bus lines in order to diagnose the redundant serial bus for a selected one of said at least one bus subscribers.

13. The method of claim 11 wherein said redundant serial bus further comprises another redundancy means which can be connected upstream and having n interfaces for connection to all of said n parallel bus lines and one interface for connection to the single bus communications interface of at least another one bus subscriber, said another redundancy means which can be connected upstream having a receiving end comprising an input stage at least for each of said bus lines, an evaluation stage and an output stage for all the bus lines, said method further comprising receiving the identical message packets on all of said bus lines in parallel by said another redundancy means, simultaneously evaluating in said another redundancy means evaluation stage the data stream message packets on each of said n parallel bus lines, said evaluation based on the content of said data stream other than a predefined error detection character included in said data stream and is other than the presence or absence of data for a period of time; and checking the evaluation of the data streams of the received message packets; and selecting depending on said simultaneous evaluation by said another redundancy means evaluation stage and independently of any selection made by any other redundancy means connected o said n parallel bus lines one of said n parallel bus lines whose data stream is passed on to the at least another one subscriber.

* * * * *